S. LORD.
Truck for Street Cars.

No. 201,539. Patented March 19, 1878.

Witnesses.
A. Ruppert,
J. G. Mason

Simeon Lord
Inventor.
D. P. Holloway & Co
Atty.

UNITED STATES PATENT OFFICE.

SIMEON LORD, OF ST. LOUIS, MISSOURI.

IMPROVEMENT IN TRUCKS FOR STREET-CARS.

Specification forming part of Letters Patent No. 201,539, dated March 19, 1878; application filed December 14, 1877.

*To all whom it may concern:*

Be it known that I, SIMEON LORD, of St. Louis, in the county of St. Louis and State of Missouri, have invented certain new and useful Improvements in Trucks for Street-Cars, of which the following is a specification:

This invention is intended for use on street-cars. Its object is to apply series of friction-wheels to the axle of the car-wheels in such a manner as to relieve the resistance of friction; and my invention consists in the arrangement of the parts of the truck-frame, by which it is adapted to the specific purpose for which it is intended.

Figure 1:
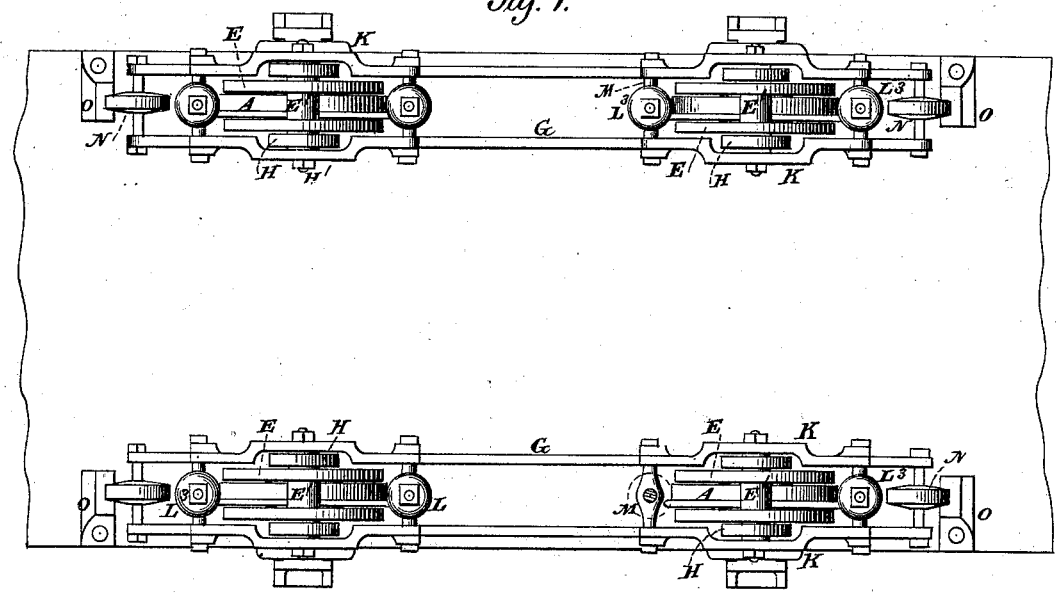
Figure 2:
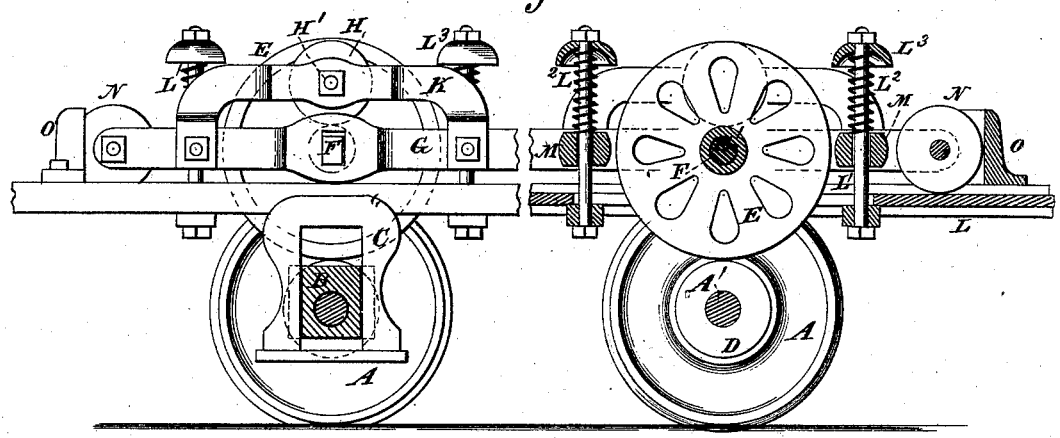
Figure 3:
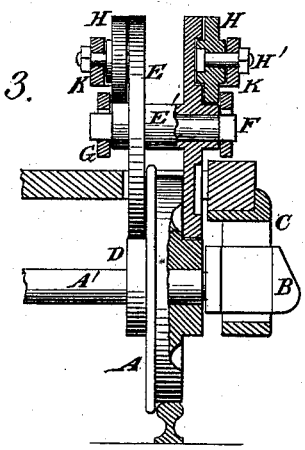

In the annexed drawing, making a part of this specification, Figure 1 is a plan view. Fig. 2 is a longitudinal sectional elevation. Fig. 3 is a transverse section of one wheel and its connecting mechanism.

The same letters are employed in all the figures in the indication of identical parts.

A A are the car-wheels, carried on ridged axles A', the ends of which are received in oil-boxes B, placed within the side brackets C, which slide up and down on the oil-boxes, so as to afford the requisite elasticity to the springs. The axles, however, do not carry the weight on their spindles, but carry the load upon steel or chilled-iron wheels D D, placed close to the wheels A, and upon each side thereof.

Reduction-wheels E E rest on the upper surfaces of the wheels D D, these wheels being hung upon a short axle, E', which overlies the car-wheel A, and has its bearing on a shaft, F, passing through the center of the hollow axles, and held in place by passing through slots in the spring-beams G, which run from end to end of the truck, and sustain in place the bearings of all the friction-wheels.

On the overhung ends of the tubular shaft E are compound reduction-wheels H, which rest on the tubular shaft, and have their bearing on short wrist-pins H', which pass through and are secured to brackets K, secured to the spring-beam G.

The car-bed L is suspended from rods L¹, which pass up through the bed of the car, and through bolsters M, fastened to the spring-beams and brackets K.

Springs L², placed around the rods L¹, rest against caps L³, so that the jar of the moving car is taken up by the elasticity of the springs L².

India-rubber rollers N are placed on shafts running through the ends of the parallel spring-beams, and these run in grooved ways O O on each end.

What I claim as my invention, and desire to secure by Letters Patent, is—

1. In combination with the wheels and axles of a railway-car, the wheels D D and E E and parallel spring-beams G G, so extended as to support the truck mechanism of both wheels on the same side of the car, substantially as set forth.

2. In combination with the wheels and axles of a railway-car, the wheels D D and E E, and parallel spring-beams G G, and wheels H H and brackets K K, substantially as set forth.

3. In combination with the wheel A and axle A', carrying the wheels D D, arranged on each side of the wheels A, the wheels E E, having a tubular axle carried on rods F, which pass through slots in the parallel spring-beams G, substantially as set forth.

4. In combination with the wheels, axle, and train of friction-wheels D D E E, the parallel spring-beams G G, carrying the bolsters M, rod L¹, and springs L², substantially as set forth.

5. In combination with the wheels, axle, and train of friction-wheels D D E E, the parallel spring-beams G G, carrying the bolster M, rods L, and springs L², together with the brackets K and wheels H, whereby the friction-wheels are maintained in an unvarying relation to one another while the car-body is allowed to play freely on its springs, substantially as set forth.

6. In combination with the wheels, axle, and train of friction-wheels, the parallel spring-beams G G, carrying the truck mechanism of both wheels on the same side of the car, and wheels N N and guideways O O, by which the spring-beams are retained in position, while the car yields freely and vertically upon its springs, substantially as set forth.

In testimony whereof I have signed my name to this specification in the presence of two subscribing witnesses.

SIMEON LORD.

Witnesses:
LUCIEN M. CHIPLEY,
WARREN BRUCE.